United States Patent Office 2,737,460
Patented Mar. 6, 1956

2,737,460

PRODUCTION OF TITANIUM PIGMENTS

Alfred J. Werner, Newport, Del., assignor to E. I. du Pont de Nemours and Company, Wilmington, Del., a corporation of Delaware No Drawing. Application February 4, 1953,
Serial No. 335,156

8 Claims. (Cl. 106—300)

This invention relates to the production of improved titanium dioxide pigments and to novel methods for preparing such pigments. More particularly, it relates to an improved process for dry grinding titanium oxide pigments in the presence of novel combinations of grinding reagents adapted to improve the film fineness, gloss, and whiteness or color characteristics of the ground pigment product.

Commercial titanium dioxide pigments are manufactured by two processes. The older process comprises precipitating the titania by hydrolyzing an aqueous solution of a titanium salt such as the sulfate, followed by filtering, washing, and variously treating the hydrolysate in the wet state with minor amounts of agents, and eventually calcining said hydrolysate, at temperatures ranging from 750–000° C., to develop essential pigment properties. The product resulting from the calcination invariably contains an undesirable amount of hard, gritty particles which are dispersed by resort to either wet or dry grinding treatment. Wet grinding breaks up such gritty particles but is disadvantageous for use because considerable expense is involved in the rewetting of the calcined pigment and thereafter filtering and drying it. Furthermore, the drying step following wet grinding frequently causes cementation of agglomerates and some sort of disintegration milling treatment is required before a smooth-textured pigment product can be obtained. As a consequence, dry grinding treatment of the calcined product has gained considerable favor in the art. A more recent process for producing $TiO_2$ pigments comprises the oxidation, at relatively high temperatures, of a titanium halide, particularly titanium tetrachloride. Anhydrous $TiO_2$ is directly obtained from this process but because of the gritty material which also exists in the product, a grinding treatment must also be applied to it. For the reasons just mentioned, resort to dry grinding is also preferred for improving the pigment texture of the product from such oxidation process. As with the calcined titanium oxide from the sulfate process, the pigment properties of the chloride product are developed during the high temperature (oxidation) operation.

In carrying out the dry grinding operation, suspending liquids are dispensed with and various types of grinding apparatus adapted to reduce the pigment to desired fine, uniform particle size, such as ball mills, bar mills, roller mills, ring mills, and the like, are employed. More recently, fluid energy types of grinding mills have been utilized for this purpose in which the pigment particles are conveyed in a plurality of streams from jets by a gaseous fluid, such as air or steam, into the outer portion of an inwardly spiraling vortex at high velocity and in a manner which will maintain the vortex at a high rotative speed and a relatively small inward speed to cause the pigment particles to rub or strike against each other or against "breaker" plates within the apparatus. One useful type of such device comprises the micronizer mill described in U. S. Patent 2,032,827, in which superheated steam comprises a conveying gas for the pigment. These fluid energy machines are capable of reducing the pigment particle size to an extent such that better film fineness and gloss are obtained than are obtainable by other methods of dry grinding. However, pigments, even rutile titanium dioxides, do not all fracture with equal ease and even with a fluid energy mill the desired minimum of film fineness and gloss is not attained.

Heretofore, various substances, such as synthetic resins or other amines have been evaluated as grinding aids to enhance the fineness and gloss. Several of these produce the desired improvement. However, none of them has proved satisfactory for the purposes of this invention as they were found to cause excessive discoloration or to produce objectionable odors, or both.

It is among the objects of this invention to overcome the above and other disadvantages characterizing prior pulverizing or grinding procedures and to provide a novel method for attaining these objects. Particular objects include the provision of an improved process for dry grinding white titanium-containing pigments, especially titanium dioxide, in which the film fineness of the $TO_2$ pigment will be effectively enhanced and the provision of an improved process of dry grinding wherein the gloss will be improved. Other objects and advantages will be apparent from the ensuing description of my invention.

These and other objects are attained in this invention which comprises improving the fineness and gloss characteristics of a titanium pigment by pulverizing said pigment in the dry state in the presence of a small amount, say, from 0.005 to 0.5%, based on the weight of the pigment, of triethanolamine along with a small amount, say from 0.05 to 5% of an aerogel capable of reducing or eliminating metallic erosion during the pulverizing.

In a more specific embodiment, the invention comprises mixing with pigment-developed, anhydrous $TiO_2$ from about 0.01 to 0.15% by weight of commercial triethanolamine, and from about 0.1 to 2.0% by weight of a silica aerogel, and dry-grinding the resulting mixture in a fluid energy type mill using high presssure steam as the source of energy until the desired fineness and gloss are obtained.

In practically adapting the invention, a relatively small amount, usually less than 0.5% and preferably less than 0.15%, based on the weight of the pigment being treated, of commercial triethanolamine, and a relatively small amount, usually less than 5% and preferably less than 2%, based on the weight of the pigment, of a substantially white aerogel are mixed with calcined, pigment-developed $TiO_2$ prior to subjecting such pigment to dry grinding to improve its fineness and gloss properties. Intimate association of the triethanolamine with the pigment can be conveniently effected by pumping the amine to the pigment flowing along a conveyor by means of a positive displacement pump, depending on the conveyor action and associated tumbling to distribute the agent. Since such a small amount is used it is found more convenient to use a water solution of triethanolamine as this allows for better distribution on the pigment. There is added at the same time, preferably but not necessarily just prior to the triethanolamine addition, a small amount, usually less than 5% and preferably less than 2% of a silica aerogel or its equivalent. This secondary addition has the effect of enhancing the desirable results obtained from triethanolamine addition and at the same time reducing the erosion of the metal of the grinding equipment. The resulting pigment-triethanolamine-aerogel co-mixture is then ground or pulverized in conventional pigment grinding equipment, preferably in a fluid energy mill, such as a micronizer, to obtain the film fineness and gloss desired. As a result the film fineness and gloss of the final pigment will be greatly improved over that obtained from pigment treated with aerogel only and especially over that obtained from untreated pigment ground under the same conditions.

It is in its application to pigments resulting from the vapor phase oxidation of titanium tetrachloride in accordance with, for instance, the methods disclosed in U. S. Patents 2,488,439 and 2,488,440, that the present invention is outstandingly useful and satisfies particular and specific needs. Such pigments are difficult to grind to satisfactory film fineness and gloss when using commercially practical grinding conditions, i. e., normal throughput rates and energy input. These grinding difficulties can be overcome effectively by grinding in the presence of small amounts of triethanolamine and an aerogel. However, it is obvious that advantages will ensue from using this treatment not only on other titanium dioxides but also on other white and also colored pigments as well since the treatment will permit obtaining better fineness and gloss with present grinding procedures or will permit obtaining equal fineness and gloss at either an increased grinding rate or in the case of fluid energy mills, at decreased energy input.

The reagents mentioned above as useful in the production of a superior pigment by my grinding procedure may be obtained in the open market. A suitable silica aerogel is available having a surface area value of about 600 square meters per gram and this commercial product is well suited for use in my grinding operation. Other products are to be found and have been mentioned heretofore in U. S. Patent 2,591,988, and accordingly, are not considered novel in themselves. The superior results are obtained when using these aerogels in combination with triethanolamine in minor amounts and as specified above. It is believed that the high surface area of the aerogel is critical as products having less than about 100 square meters per gram have not yielded the desired results and the product of enhanced properties. The best results are obtained when using aerogel products having 500 or more square meters per gram surface area. The aerogels may be of a number of inorganic oxides such as the oxides of silicon, aluminum, titanium, zirconium and the like, but the ones of specific interest at this state of the art are aerogels of silicon and aluminum oxides. The term "aerogel" refers to the particularly voluminous dried gel prepared from a large number of colloidal systems by removing the liquid from a gel under special conditions designed to prevent substantial shrinkage. A gel is a non-fluid system comprising a fluid phase and a solid phase, the solid phase being porous or web-like extending throughout the fluid phase and being formed by the coagulation of colloidal particles. It may be very soft or quite rigid depending upon the concentration and degree of gelation. When the fluid phase is water the system is called a hydrogel. The fluid may also be an organic liquid. These liquids may be replaced by a gas such as air. When a gel is dried by normal evaporation of the liquid, the gel shrinks to fifty or less per cent of its original volume and the dried microporous product is called a xerogel. An aerogel, however, is prepared by removing the liquid from a gel under special conditions which substantially prevent a large part of the shrinking encountered in preparing a xerogel. Among useful methods for effecting aerogel preparation, the procedures set forth by Professor S. S. Kistler disclosed in the 1932 publication of the Journal of Physical Chemistry, vol. 36, page 52, can be resorted to. According to that disclosure, the gel is placed under a pressure equal to or greater than the critical pressure of the liquid phase, the temperature is raised to or above the critical temperature and the vapor drawn off and replaced by air leaving the solid phase in the form of an aerogel which, in the case of silica, occupied about 80% of the volume of the original gel. An aerogel is characterized also by the fact that when it is resaturated by the liquid and dried normally a large shrinkage occurs, whereas an xerogel is substantially unchanged by this treatment, it having already undergone this shrinkage in its preparation. The aerogels are further characterized by their low bulk density, for example, the ordinary "silica gel" of commerce, which is a highly porous xerogel, has a density of from about 38 to 65 pounds per cubic foot, whereas silica aerogels have bulk densities from five to ten pounds per cubic foot. The bulk density of such aerogels may be varied considerably, that is, it may be increased from the very low range to the rather indefinite range of values between aerogels and xerogels by aging and partial drying of the initial gel. In their application to this invention, aerogels from the white, colorless, or very light-colored members of the species, such as those obtained from the hydrous oxides of aluminum and silicon, are preferred for use.

Triethanolamine has been found to give results superior to other organic liquids and this is believed due to its ability as a wetting and dispersing agent and also its resistance to decomposition or carbonization under the conditions encountered in fluid energy mills operated with steam as the fluid. The best results are obtained with triethanolamine having not more than 20% of the related chemical compounds, namely, diethanolamine, and monoethanolamine. These lower compounds are not as effective as wetting and dispersing agents in the process and at the same time tend to discolor during the grinding operation. It is thus seen that superior quality to be obtained by my invention depends on a careful selection of products to be used in the grinding operation and the amounts to be used. It is believed that other trialkanol amines such as trimethanolamine, tripropanolamine, and tributanolamine will also be useful in the process, but triethanolamine is of greatest interest because of its commercial availability at the present time. The above mentioned alkanol amines have molecular weights varying from about 107 to about 233.

The action of triethanolamine in connection with an aerogel is to improve the dispersion of the pigment in the grinding mill, thereby facilitating removal of the fines and permitting more of the available energy to be expended in the grinding of the coarse pigment. The improved product is demonstrated by a few tests on paints made from the ground pigment. Film fineness and gloss may be demonstrated by incorporating the pigment into paint such as is normally employed for white enameled refrigerators. This paint or enamel is made by stirring the pigment into a refrigerator enamel vehicle, these vehicles being readily available on the market, under standard mixing conditions and then ground on 5 roll paint mills under standard mill wetting conditions so that the various paints will be ground under identical conditions to demonstrate the difference in texture, fineness and gloss of the pigments used in the making of the enamels. The fineness of the pigment is demonstrated on a drawdown film made from the enamel using a film applicator giving a wet paint film of 0.002" thickness. The paint film is allowed to dry in a dust-free atmosphere and then compared for fineness and rated on a scale where 10 is perfect and 0 is very bad. A quarter of a point on this scale is readily seen by a trained observer and is regarded as important in the trade.

Gloss ratings may be obtained on the same enamel by reducing a portion of the enamel to spray consistency, spraying the enamel onto aluminum panels and again letting the panels dry in a dust-free atmosphere. Gloss ratings on the films are also made on a scale ranging from 10 for high gloss films to 0 for films which are substantially devoid of gloss. Here again a quater point is discernible and also regarded as important to consumers of paint pigments.

It is thus seen that my process is designed for the production of quality pigments from heat treated titanium oxide materials such as result from calcination of hydrolysates from titanium sulfate solutions and also from the oxidation products of titanium tetrachloride. The titanium oxide product from both of these processes contain substantial amounts of coarse pigment due to the fact that they have been subjected to high temperatures and may be regarded as calcined pigments. The fluid energy mills have been found highly effective in the breaking up of the coarse fractions in the titanium pigment and the use of high pressure steam as a source of energy is widely used in these mills. This necessitates the operation of the mill at high temperature, i. e., in excess of 300° C., and causes breakdown of many organic reagents which might otherwise be useful in the grinding of the pigment. Triethanolamine has been found superior to all other organic reagents tested and particularly of value in connection with the aerogel which assists in the maintenance of the color of the pigment in its unground condition. In addition, probably due to better classification, there is a slight improvement in tinting strength and hiding power and less flooding and sagging of the paints made from pigments prepared in this manner. However, as has been pointed out above, if the quality improvement is not desired, the use of this treatment permits a reduction in grinding time or a decrease in the energy, steam or gas in the case of fluid energy mills, required.

To a clearer understanding of the invention, the following specific examples are given. These are merely illustrative and not to be taken as in limitation of the invention.

*Example I*

Two thousand parts of a $TiO_2$ pigment produced by the oxidation of $TiCl_4$, in accordance with the procedures of the patents above referred to, were thoroughly mixed with one part by weight of a commercial triethanolamine and ten parts by weight of a commercial silica aerogel prepared as outlined in the Journal of Physical Chemistry, vol. 36, page 52, 1932. Undiluted triethanolamine was used and was so distributed throughout the pigment that no appreciably large pasty lumps resulted. The resulting mixture was then dry ground by being fed through a 36" diameter "micronizer" apparatus similar in construction to the device shown in U. S. Patent No. 2,032,827 at a rate of 30 pounds per minute. Previously, and for purposes of comparison, pigment treated only with the aerogel and untreated pigment were ground in the same machine at the same rate. The following results were obtained from the three grinding operations:

|  | Tinting Strength | Film Fineness | Gloss |
| --- | --- | --- | --- |
| Untreated $TiO_2$ | 178 | 7½ | 7¼ |
| $TiO_2$+aerogel only | 196 | 8 | 7¼ |
| Fully treated $TiO_2$ | 196 | 9 | 8 |

It is evident that while aerogel alone gives an improvement in film fineness the triethanolamine-aerogel combination not only gives a further improvement but also improves the gloss. The tinting strength values given were obtained from the tests described in U. S. Patent 2,046,054.

*Example II*

Two thousand parts of a $TiO_2$ pigment produced as noted in Example I were mixed with 10 parts by weight of triethanolamine and 10 parts by weight of a silica aerogel. The mixture was then ground as previously outlined except that the steam thruput for the treated pigment in one test was reduced to 90% of that used for the controls. The following results were obtained:

|  | #/hr. Steam input | Tinting Strength | Film Fineness | Gloss |
| --- | --- | --- | --- | --- |
| Untreated $TiO_2$ | 5,320 | 188 | 7¼ | 6¾ |
| $TiO_2$+aerogel only | 5,320 | 192 | 8 | 7¼ |
| Fully treated $TiO_2$ | 5,320 | 206 | 9 | 8 |
| Fully treated $TiO_2$ | 4,760 | 205 | 8 | 7¼ |

Therefore, with less energy input the treatment gave film fineness and gloss results equal to those obtained at normal energy input when using aerogel alone while with regular steam input the improved results were found.

*Example III*

Two thousand parts of a calcined $TiO_2$ pigment produced by commercial sulfate solution methods were mixed with one part by weight of triethanolamine and 10 parts by weight of a silica aerogel. The mixture was then ground as outlined in Example I in comparison against the same $TiO_2$ treated with silica aerogel only. The following results were obtained:

|  | Film Fineness | Gloss |
| --- | --- | --- |
| Aerogel treated $TiO_2$ | 6¼ | 7½ |
| Fully treated $TiO_2$ | 7 | 8 |

While use is preferred of commercial triethanolamine which contains, in addition to 80 to 85% triethanolamine, about 15% of diethanolamine, and 1 to 2.5% monoethanolamine, purified triethanolamine may be used. Furthermore, the triethanolamine may be applied to the pigment directly, or, if found more expedient in order to obtain better distribution on the pigment, it may be applied as a water solution which may under certain circumstances be as dilute as 5% triethanolamine or even less.

Since commercial triethanolamine contains lower amines, tests were made to determine if these might be as effective or more effective in improving quality than triethanolamine. These showed that the lower ethanolamines were equally effective in improving the film fineness and gloss of pigment but caused considerably greater color degradation and, therefore, were not as suitable.

The pigments to which this invention applies comprise the general class of calcined pigment, i. e., pigment which has been exposed to high temperature during the course of its manufacture and preferably those which contain titanium dioxide. Such $TiO_2$ pigments usually contain from 20% to 100% of commercial titanium dioxide as a prime pigment, with the remainder being made up of an alkaline earth metal sulfate or carbonate extender material, such as calcium carbonate, calcium sulfate, barium sulfate, or siliceous materials, and the like. The $TiO_2$ may be either in the anatase or rutile crystalline form and may result from the hydrolysis or oxidation processes referred to. While $TiO_2$ pigments, either alone or extended, are particularly contemplated for treatment herein, other forms of titanium pigments, including the various titanates, are also contemplated for treatment, with advantageous beneficial effects.

It will also be understood that although the invention is especially useful in the dry grinding of pigments in fluid energy or jet types of mills, such as those described in Perry's Chemical Engineers Handbook, 3d edition, pages 1145–47, in order to overcome the pigment quality impairment and excessive mill wear particularly experienced in such types of milling equipment, it has general application to other common types of pigment milling means, including ball mills, pebble mills, rod mills, etc., consisting of a rotatable shell containing a large number of loose, tumbling, grinding elements, as well as other forms of milling means in which reduction of pigment particle size can be effected.

The action of triethanolamine in conjunction with aerogels is believed to be that of a dispersing agent, thereby removing fines from the grinding mills rapidly and permitting the grinding energy to be expended on the coarse particles only. It thereby improves the classification of fines from coarse and improves the grinding efficiency. Other pigment dispersants are known but none is as efficient in producing the quality improvements either in amount of agent required, unit cost of treatment or in improving one quality without deteriorating others.

Pigments prepared with a combination of triethanolamine and aerogel in the amounts specified in this invention possess advantages over pigment prepared with aerogel alone and may be enumerated as follows: (1) Improved film fineness, (2) Improved gloss, (3) Improved tinting strength, (4) Improved hiding power, (5) Improved spinout fineness, (6) Less flooding, (7) Less sagging.

I claim as my invention:

1. A process for the preparation of an improved titanium pigment which comprises dry grinding said pigment in the presence of from 0.05 to 5 parts by weight of an aerogel and from 0.005 to 0.5 parts by weight of a trialkanol amine per 100 parts by weight of the pigment.

2. A process for the preparation of improved calcined titanium dioxide pigment which comprises adding to said pigment not more than 5% by weight of a substantially white aerogel and not more than 0.5% by weight of a trialkanolamine and subjecting the mixture to dry milling treatment until a fine-textured product is obtained.

3. A process for the preparation of an improved titanium pigment which comprises dry grinding said pigment in the presence of from .05 to 5% by weight of a silica aerogel and from .005% to .5% by weight of triethanolamine.

4. A process for the preparation of an improved calcined white titanium dioxide pigment which comprises adding to said pigment not more than 5% by weight of silica aerogel and not more than 0.5% by weight of triethanolamine and subjecting the resulting mixture to fluid energy dry milling.

5. A process for the preparation of an improved calcined white titanium dioxide pigment which comprises adding to said pigment not more than 5% by weight of alumina aerogel and not more than 0.5% by weight of triethanolamine and subjecting the resulting mixture to fluid energy dry milling.

6. A process for the preparation of an improved calcined white titanium dioxide pigment which comprises adding to said pigment from about one-tenth to 2% by weight of silica aerogel and from about .01 to .15% by weight of triethanolamine and subjecting the resulting mixture to fluid energy dry milling.

7. A process for the preparation of an improved calcined white titanium dioxide pigment which comprises adding to said pigment from about one-tenth to 2% by weight of alumina aerogel and from about .01 to .15% by weight of triethanolamine and subjecting the resulting mixture to fluid energy dry milling.

8. A process for the preparation of titanium dioxide pigment of improved pigment properties which comprises adding to a titanium dioxide pigment resulting from the oxidation of titanium tetrachloride not more than 5% by weight of a substantially white aerogel and not more than 0.5% by weight of triethanolamine and subjecting the mixture to dry grinding in a fluid energy type mill.

References Cited in the file of this patent

UNITED STATES PATENTS

| 2,386,885 | Downs et al. | Oct. 16, 1945 |
| 2,578,605 | Sears | Dec. 11, 1951 |
| 2,591,988 | Willcox | Apr. 8, 1952 |
| 2,614,994 | Balthes | Oct. 21, 1952 |

FOREIGN PATENTS

| 251,665 | Great Britain | July 15, 1926 |